UNITED STATES PATENT OFFICE 2,260,994

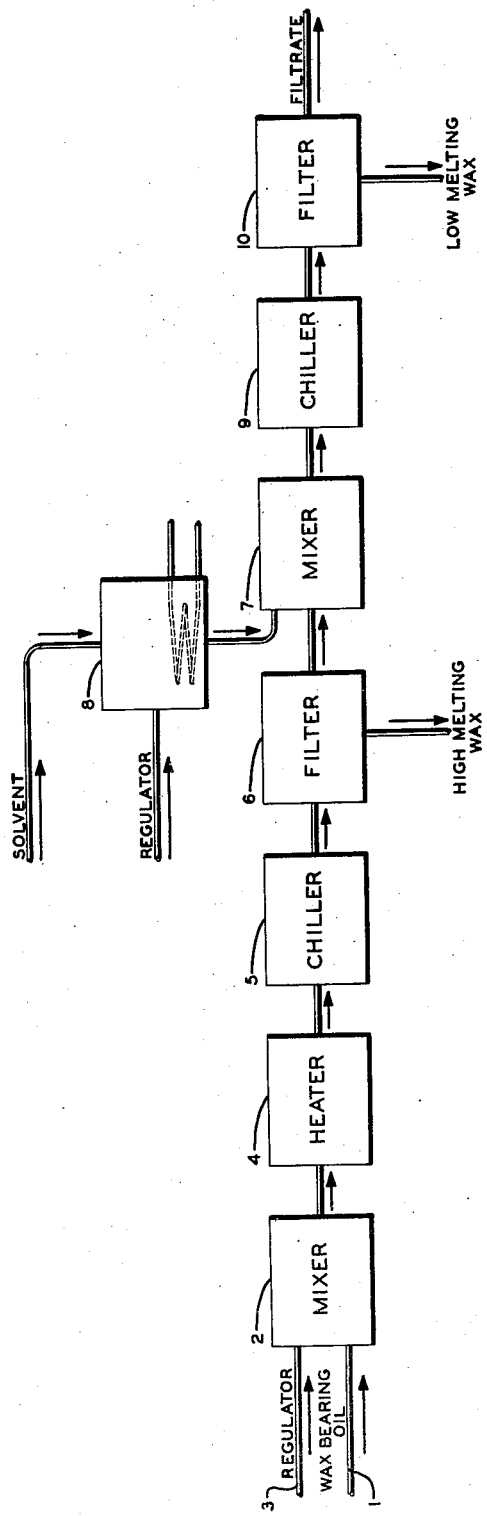
Oct. 28, 1941. E. C. KNOWLES 2,260,994
SEPARATION OF WAX FROM OIL
Filed Oct. 17, 1936
EDWIN C. KNOWLES
INVENTOR
ATTORNEYS

SEPARATION OF WAX FROM OIL

Edwin C. Knowles, Beacon, N. Y., assignor to The Texas Company, New York, N. Y., a corporation of Delaware Application October 17, 1936, Serial No. 106,198

2 Claims. (Cl. 196—18)

This invention relates to a method of separating wax from hydrocarbon oil, and particularly to a method of separating wax from wax-bearing mineral oil.

The invention broadly contemplates the separation of wax from wax-bearing oil wherein wax of desired melting point is obtained, and in addition a lubricating oil of desired low pour test. It involves a modification of the method disclosed in my copending application, Serial No. 41,393, and in which the mixture of wax-bearing oil and solvent containing wax crystal modifying material is heated to an elevated temperature prior to chilling. The heated mixture is chilled to precipitate the wax constituents, and the wax constituents thus precipitated are removed by mechanical means, such as filtration.

The present application is, therefore, a continuation-in-part of my above mentioned copending application, Serial No. 41,393, filed September 20, 1935, for Dewaxing mineral oil.

The object of my invention is to produce from wax-bearing mineral lubricating oil stock both high and low melting point paraffin wax, and also to produce lubricating oil having a pour test of 0° F. and below in a single dewaxing operation.

In carrying out the method of my invention, wax-bearing mineral lubricating oil stock is mixed with a suitable solvent liquid and a wax crystal modifying substance is incorporated therein. The mixture is then heated to a temperature in the range 130° to 175° F., and thereafter chilled in stages. In the first stage, the mixture is chilled to a temperature in the range of about 35° to 80° F., or substantially above 0° F. in order to precipitate high melting point wax. This precipitated wax is removed by filtration for example. After the removal of this wax, the solution is further chilled in a second stage to a temperature of around 0° F. or below in order to precipitate the relatively lower melting point wax constituents. These low melting point wax constituents are removed and the solvent liquid then recovered from the dewaxed oil.

I contemplate using as the wax crystal modifying substance a material which consists in part of a substance adapted to modify the crystal structure of the high melting point wax constituents, and in part of a substance adapted to modify the crystal structure of the low melting point wax constituents. If desired, the modifier for the high melting point wax constituents may be incorporated alone prior to removal of the high melting point wax constituents, while the modifier for the low melting point wax constituents may be incorporated in the wax-bearing oil-solvent mixture subsequent to the removal of the high melting point wax constituents.

I have found that a suitable wax crystal modifying material comprises a mixture of crude montan wax and a metallic soap of the fatty acids. The montan wax serves as a modifier for the high melting point wax constituents, while the metallic soap serves as a modifier for the low melting point wax constituents.

As examples of a metallic soap suitable for the purpose of my invention, the following may be mentioned: Aluminum stearate, lead stearate; also magnesium soap consisting mainly of a mixture of magnesium stearate and magnesium palmitate. Metal soaps of naphthenic acids, such as aluminum naphthenate and lead naphthenate may also be used.

The montan wax may be used in its natural state, or, if desired, the active ingredients having the desired modifying action may be extracted from the crude wax and used instead of the crude wax.

I have found that a mixture of crude montan wax and aluminum stearate provides a very satisfactory and effective modifier. This mixture may be incorporated in the wax-bearing oil at the outset, and thus avoid the necessity for an intermediate heating step prior to the second chilling stage since the aluminum stearate remains in solution at the chilling temperature prevailing in the first stage.

The amount of modifying substance used is around .1 to 1.0% weight of the wax-bearing oil undergoing treatment. A relatively small amount of the material is required as, for example, around .04% of crude montan wax and 0.25% aluminum stearate, when employing a mixture of these substances as the modifier.

As disclosed in my above mentioned copending application, the wax crystal modifying material, such as those mentioned above, is rendered unexpectedly more effective in the dewaxing operation when the mixture of wax-bearing oil, modifier and solvent is heated to a substantially elevated temperature prior to chilling. This temperature is around 15° to 50° F. above the minimum temperature of apparent complete solution of wax-bearing oil in the solvent. This is manifested by a greatly increased rate of filtration of precipitated wax from the cold solution, and also by an increase in the yield of dewaxed oil. The wax removed is also substantially free from retained oil. The improvement in filtration rate is apparently the result of the wax having been precipitated from the oil in a more readily filterable condition.

As discussed in my copending application, the minimum temperature of apparent complete solution of wax-bearing oil in the solvent is in the case of a solvent mixture consisting of ketone and benzol around 90 to 125° F. Also, as explained therein, by heating the mixture of wax-bearing oil and solvent to a temperature of 15 to 50° F. above this minimum temperature, the wax crystal modifying substances are apparently completely dissolved in the solvent and, at this elevated temperature, the oil and wax remain in solution in the solvent.

There appears to be a critical range of temperature within which these unexpectedly improved results are realized upon subsequent chilling and filtration. For example, with a solvent mixture of acetone or methyl ethyl ketone and benzol, it is necessary to heat the mixture of oil and such solvent to a temperature in the range 130° to 175° F. prior to chilling; with a solvent of the light petroleum type, corresponding to pentane for example, the temperature range is from 150° to 190° F. with a decided maximum point at about 160° F. At temperatures below and above 160° F., the rate at which the precipitated wax can be subsequently filtered from the cold solution falls off sharply.

In the case of highly viscous distillate stocks, and also of residual stocks, heating the mixture of such stock and solvent in the absence of an added wax crystal modifier results in substantial improvement. It seems that these highly viscous and heavy stocks contain naturally-occurring wax crystal modifying substances, particularly where these stocks have not been previously subjected to treatment with acid or other reagents to remove their asphaltic constituents.

For example, distillate stocks having a Saybolt Universal viscosity of over 75 seconds at 210° F. apparently contain substantial amounts of these naturally-occurring wax crystal modifying substances, while distillates of lower viscosity apparently do not contain them to any appreciable extent.

However, even in the case of these highly viscous and heavy stocks, a further improvement with respect to filtration rate and degree of separation between oil and wax results by incorporating in the oil an artificial wax crystal modifying substance.

While I have mentioned acetone and benzol, and also pentane, as examples of dewaxing solvents, it is contemplated that other dewaxing solvent may be employed in the practice of my invention.

It is advantageous to employ a selective type of dewaxing solvent, consisting of a mixture of a solvent liquid for the liquid constituents of oil, and an anti-solvent liquid for the wax constituents of oil. As examples of such a selective solvent, I contemplate mixtures of acetone or methyl ethyl ketone and isopropyl ether, or mixtures of acetone or methyl ethyl ketone and benzol. It is, of course, contemplated that instead of benzol, toluol may be used, or mixtures of benzol and toluol.

It is advantageous to use the solvent mixture in the ratio of around two to five parts of solvent mixture to one part of oil, different stocks requiring somewhat different proportions of the solvent.

In order to further describe the operation of my invention, reference will now be made to the following examples.

A wax-bearing lubricating oil distillate having a Saybolt Universal viscosity of about 75 seconds or less at 210° F., and such as derived from Mid-Continent crude, is mixed with a mixture consisting of about 50% methyl ethyl ketone and 50% isopropyl ether in the proportion of two parts of solvent mixture to one part of oil.

To this mixture is added montan wax and aluminum stearate in the proportion of about .04% montan wax and 0.25% aluminum stearate by weight of the wax distillate.

This mixture is then heated to a temperature of about 175° F. and thereafter chilled to about 40° F. The cold mixture is filtered at this temperature to remove wax constituents having a melting point of around 145° to 150° F.

The cold filtrate, after removal of the high melting point wax, is then chilled in a second stage to a temperature of about −15° F. and filtered to remove wax constituents having a melting point of around 120° to 125° F.

The resulting filtrate is withdrawn and the solvent liquid removed therefrom as, for example, by stripping in the presence of steam. The dewaxed oil will have a pour test of around −10° F.

Where the wax crystal modifiers are added in separate stages, as previously indicated, the wax-bearing oil is diluted with a solvent mixture in the same ratio. Montan wax is then added to the mixture, and the resulting mixture heated to about 175° F.

The hot mixture is chilled in the first stage to 40° F. and filtered to remove the high melting point wax.

Aluminum stearate is then incorporated in the filtrate in about the same proportion as mentioned in the preceding example. This may be accomplished by dissolving the aluminum stearate in a relatively small volume of solvent liquid mixture by heating it to a temperature of around 175° F. and then adding this hot solution to the body of filtrate from the first stage so as to give a dilution ratio of three parts of solvent mixture to one part of oil.

The resulting mixture is then chilled in the second stage to a temperature of −15° F. and filtered to remove the low melting point wax constituents as above described.

In order to illustrate one method of carrying out the process of the invention, reference will now be made to the accompanying flow diagram.

As indicated, wax-bearing oil, from a source not shown, is conducted through a pipe 1 to a mixer 2. A small quantity of a wax crystal regulator, namely montan wax, is introduced from a source not shown, through a pipe 3 to the mixer 2.

The resulting mixture is passed from the mixer 2 to a heater 4 wherein it is heated to a temperature sufficiently high to condition the mixture. The conditioned mixture passes from the heater 4 to a chiller 5 wherein it is chilled to a temperature in the range 35 to 80° F. in order to precipitate high melting point wax. The chilled mixture passes to a filter 6 wherein the precipitated wax is removed from the mixture.

The resulting filtrate containing the low melting point wax is then passed to a mixer 7 wherein a small amount of a regulator for the low melting point wax constituents is incorporated. This regulator, for example, aluminum stearate, is conducted from a source not shown to a small vessel 8 to which a relatively small proportion of dewaxing solvent is introduced for the purpose of making a concentrated solution of the regulator. The solution may be heated to a temperature of around 175° F. prior to introduction to the previously mentioned mixer 7.

The mixture from the mixer 7 passes through a chiller 9 wherein it is chilled to a temperature of —15° F., for example. The resulting chilled mixture is then passed to a filter 10 wherein the precipitated low melting point wax is removed. The filtrate produced comprises the dewaxed oil having a pour test of 0° F. and below.

In the appended claims "montan wax" is used to refer to the crude unrefined montan wax or to the active ingredients thereof which exert the desired modifying action upon the paraffin wax constituents of the mineral oil undergoing treatment.

Obviously, many modifications and variations of the invention, as hereinbefore set forth, may be made without departing from the spirit and scope thereof, and therefore only such limitations should be imposed as are indicated in the appended claims.

I claim:

1. The method of removing wax from wax-bearing mineral lubricating oil containing high and low melting point wax constituents by filtration wherein high melting point wax is removed in a preliminary filtration and low melting point wax removed in a subsequent filtration, comprising mixing the wax-bearing oil with a dewaxing solvent, incorporating in the oil a wax crystal modifier comprising montan wax, chilling the mixture to a temperature of around 35 to 80° F. to precipitate high melting point wax, removing the precipitated wax in the presence of the montan wax, incorporating in the remaining solution a different wax crystal modifier for low melting point wax and which is partially soluble in the wax-bearing mixture at above the dewaxing temperature, chilling the mixture to a temperature of around 0° F. and below to precipitate low melting point wax, and removing the precipitated wax in the presence of the modifier for low melting point wax.

2. The method of removing wax from wax-bearing mineral lubricating oil containing high and low melting point wax constituents by filtration wherein high melting point wax is removed in a preliminary filtration and low melting point wax removed in a subsequent filtration, comprising mixing the wax-bearing oil with a dewaxing solvent, incorporating montan wax in the oil sufficient in amount to modify the high melting point wax constituents, chilling the mixture to a temperature substantially above 0° F. to precipitate high melting point wax constituents, removing the precipitated wax in the presence of the montan wax, incorporating in the remaining mixture a small amount of metallic soap of a higher fatty acid sufficient to modify the low melting point wax constituents, chilling the mixture to a temperature of around 0° F. and below to precipitate low melting point wax, and removing the precipitated low melting wax in the presence of the soap.

EDWIN C. KNOWLES.